Nov. 23, 1948.  J. S. SLAMKA  2,454,722
LICENSE PLATE HOLDER
Filed March 25, 1946
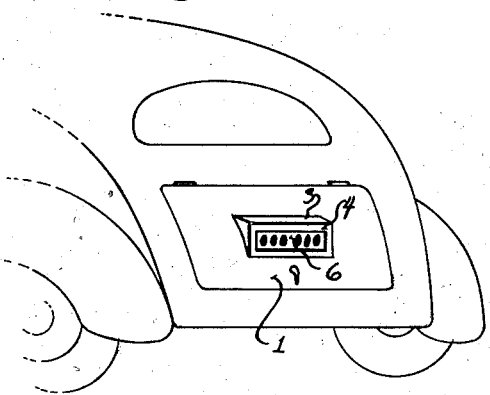
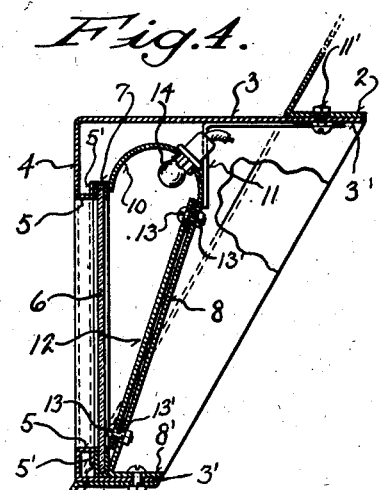
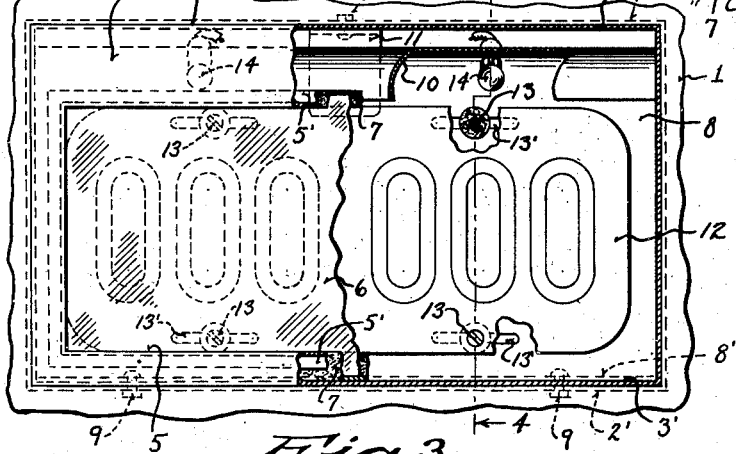
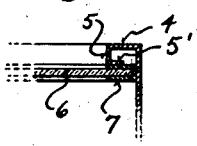
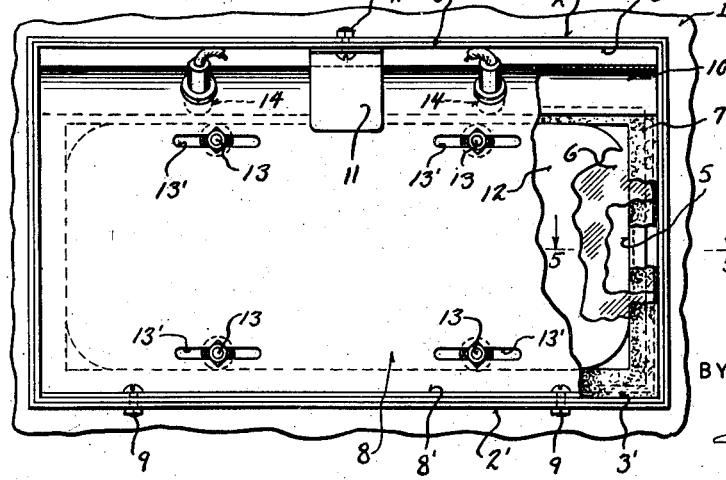
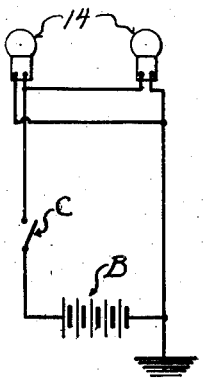
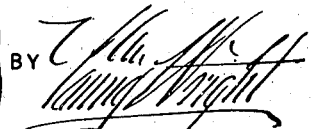
INVENTOR
JOSEPH S. SLAMKA
BY
ATTORNEYS Patented Nov. 23, 1948

2,454,722

UNITED STATES PATENT OFFICE 2,454,722

LICENSE PLATE HOLDER

Joseph S. Slamka, Milwaukee, Wis.

Application March 25, 1946, Serial No. 657,032

1 Claim. (Cl. 40—130)

My invention refers to license plate holders and it has for its primary object to provide a glazed license plate holder permanently fitted into an opening in the locked trunk door of an automobile, the same having a removable license housing panel formed with an upper reflecting shell carrying light bulbs in circuit with the ignition switch of the vehicle, whereby theft of the plate is eliminated and, in case of speed violation or hit and run drivers, the license plate will be constantly illuminated when the vehicle is traveling. Thus, the vehicle may be readily identified.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Fig. 1 represents a perspective view of an automobile illustrating the hinged trunk lid having a license plate holder therein, embodying the features of my invention.

Fig. 2 is an enlarged fragmentary face view of the trunk lid and license plate holder, with parts broken away and parts in section to more clearly illustrate details of construction.

Fig. 3 is a reversed face view of the license plate holder, with parts broken away and in section.

Fig. 4 is a cross sectional view of the license plate holder, the section being indicated by line 4—4 of Fig. 2.

Fig. 5 is a fragmentary corner sectional view of the holder and glass plate attached thereto, the section being indicated by line 5—5 of Fig. 3; and Fig. 6 is a diagrammatic view illustrating the electric light bulbs in circuit with a standard ignition switch, which switch controls the starting and stopping of the engine.

Referring by characters to the drawings, 1 indicates the hinged lid of a trunk compartment, which lid is under lock control. The lid is cut away to form a rectangular opening therein having upper and lower inturned connected flanges 2—2', respectively.

A rectangular hood 3 has inner ends 3' fitted to the flanges 2 and 2', and said inner edges are permanently secured to said flanges by spot welding, or the like, whereby the hood becomes an integral part of the trunk lid.

The protruding front face 4 of the hood is formed with a window or opening 5 therein, and said opening terminates with an inturned beaded flange 5' for the reception of a pane of glass 6. The edges of the glass are bound by a felt pad 7, which pad is secured to the hood flange 5' by suitable adhesive, whereby vibration of the glass is absorbed and rattle of the same avoided. It is emphasized, however, that the glass may be secured in any suitable manner, other than that shown.

An angularly disposed metallic panel 8, having a bottom inturned flange 8', is seated and adjusted upon the hood flange 3 and thereafter it is secured, in its adjusted position, by bolts 9. The upper outwardly flared end of the panel is formed with an outwardly turned circular flange constituting a reflector 10, the end of which reflector engages the binder 7 of the glass.

This reflector portion of the panel 8 is also securely held in its position by an angular strip 11, which strip is secured by a bolt 11' that extends through the flange 2 and end 3' of the upper hood connection.

Any standard license plate 12 is fitted to the inner face of the panel, as best indicated in Figs. 2 and 4 of the drawings, the same being in alignment with the glass pane 6, whereby said license plate is visible. The license plate 12 is secured to the panel by felt washer bolts 13—13, which bolts pass through horizontal slots 13', formed in the panel, to permit securement of various sized license plates.

The plate holder is completed by inserting through the reflector shell a pair of light bulbs 14, which light bulbs, due to the reflector, brilliantly expose the license plate. The bulbs, as indicated in the diagrammatic view, Fig. 6, are in circuit with the standard battery B and an ignition switch C, which is key controlled in all standard automobiles.

From the foregoing description, it is understood that the trunk lid, or other sealed wall, is inaccessible from the outside and thus, the license plate holder will always remain intact, unless the lock or seal is released, whereby the party controlling the automobile may have access to the inner open face of the hood. This access is for the purpose of removing and substituting license plates for different periods. For example, should it be desired to remove the license plate, the operator will simply swing the angular strip 11 clear of the panel and, thereafter the bolts 9—9 are removed, whereby the panel is accessible for the purpose of removing the license plate 12 and substituting therefor a second license plate. This being effected by manipulating the attaching screws 13.

It is also emphasized, due to the illuminating bulbs being in circuit with the ignition switch, that it is impossible to cut out said bulbs except through manipulation of the ignition key controlled switch C, in which case the automobile, being cut off from its power, would stop.

I claim:

In a motor vehicle having an inturned flanged opening in its body; the combination of a license plate holder comprising a hood having inturned ends fitted in the flanges of the body opening and provided with a flanged opening in its front wall having a glass fitted therein, a panel having a bottom inturned flange secured to the flanges of the hood and body opening, the upper end of the panel being curved outwardly in circular form and in contact with a flange of the hood opening, an angular strip being adapted to engage and confine the circular portion of the panel, a license plate secured to said panel, and a light bulb mounted in the circular portion of the same.

JOSEPH S. SLAMKA.

REFERENCES CITED

The following references are of record in the file of this patent:

UNITED STATES PATENTS

| Number | Name | Date |
|---|---|---|
| 1,448,881 | Theis | Mar. 20, 1923 |
| 2,057,249 | Rioux | Oct. 13, 1936 |
| 2,104,539 | Hacker | Jan. 4, 1938 |
| 2,128,679 | Kielian | Aug. 30, 1938 |
| 2,349,703 | Carlin | May 23, 1944 |

FOREIGN PATENTS

| Number | Country | Date |
|---|---|---|
| 456,732 | Great Britain | Nov. 10, 1936 |